Nov. 14, 1967        J. H. KIRBY II        3,352,360
FREE POINT INDICATOR
Original Filed Oct. 19, 1965        3 Sheets-Sheet 1
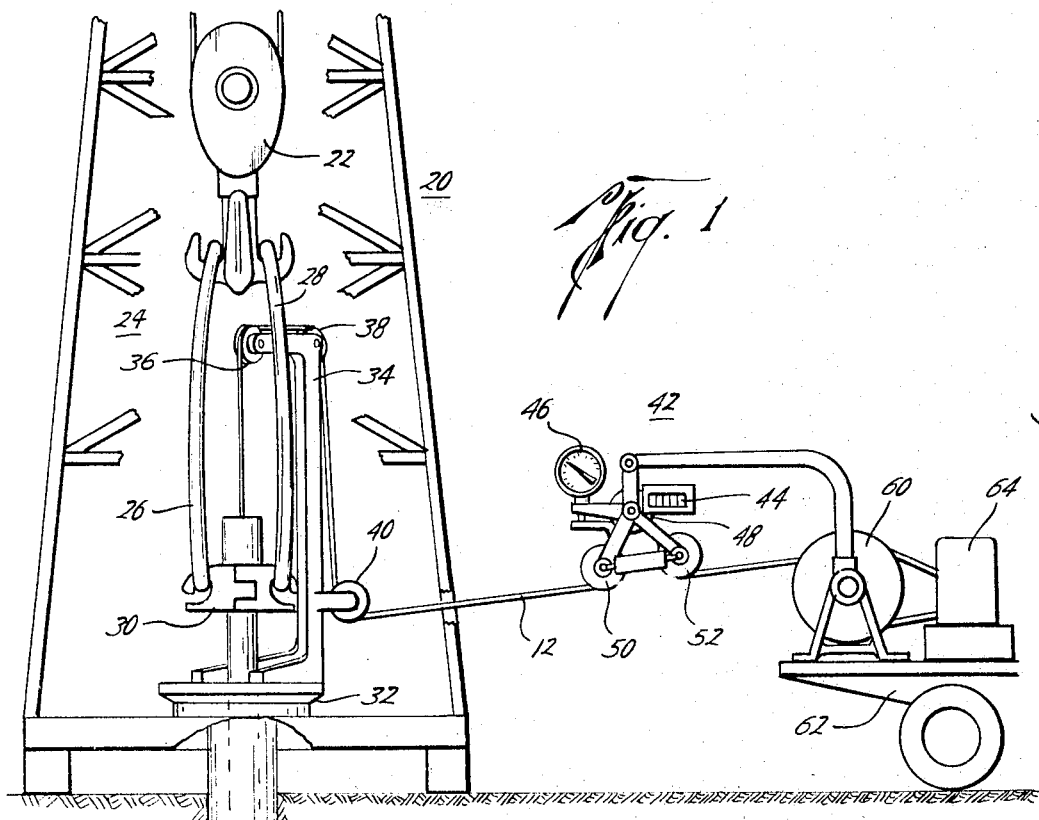
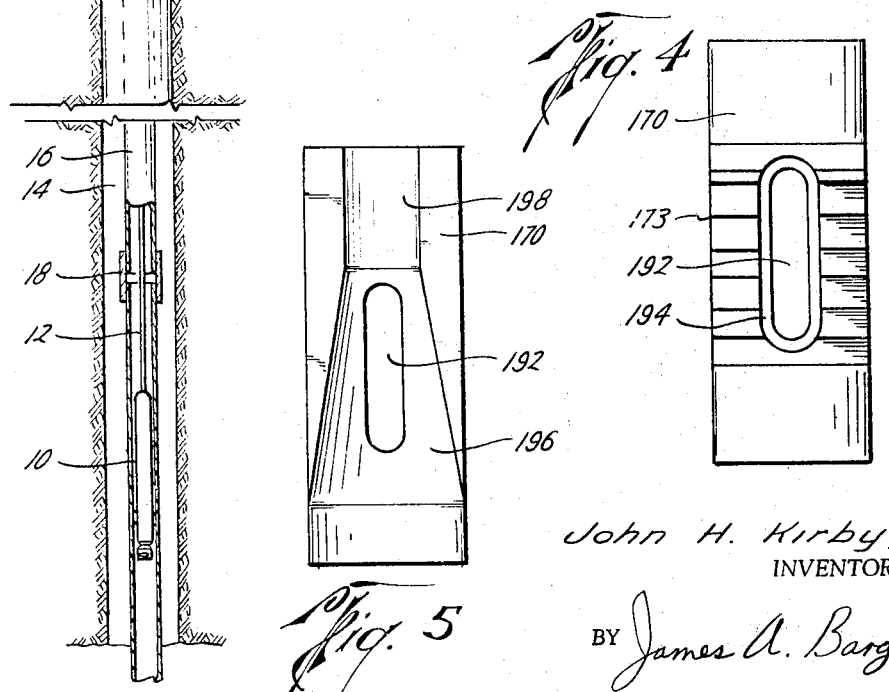
John H. Kirby, II
INVENTOR.
BY James A. Bargford
ATTORNEY

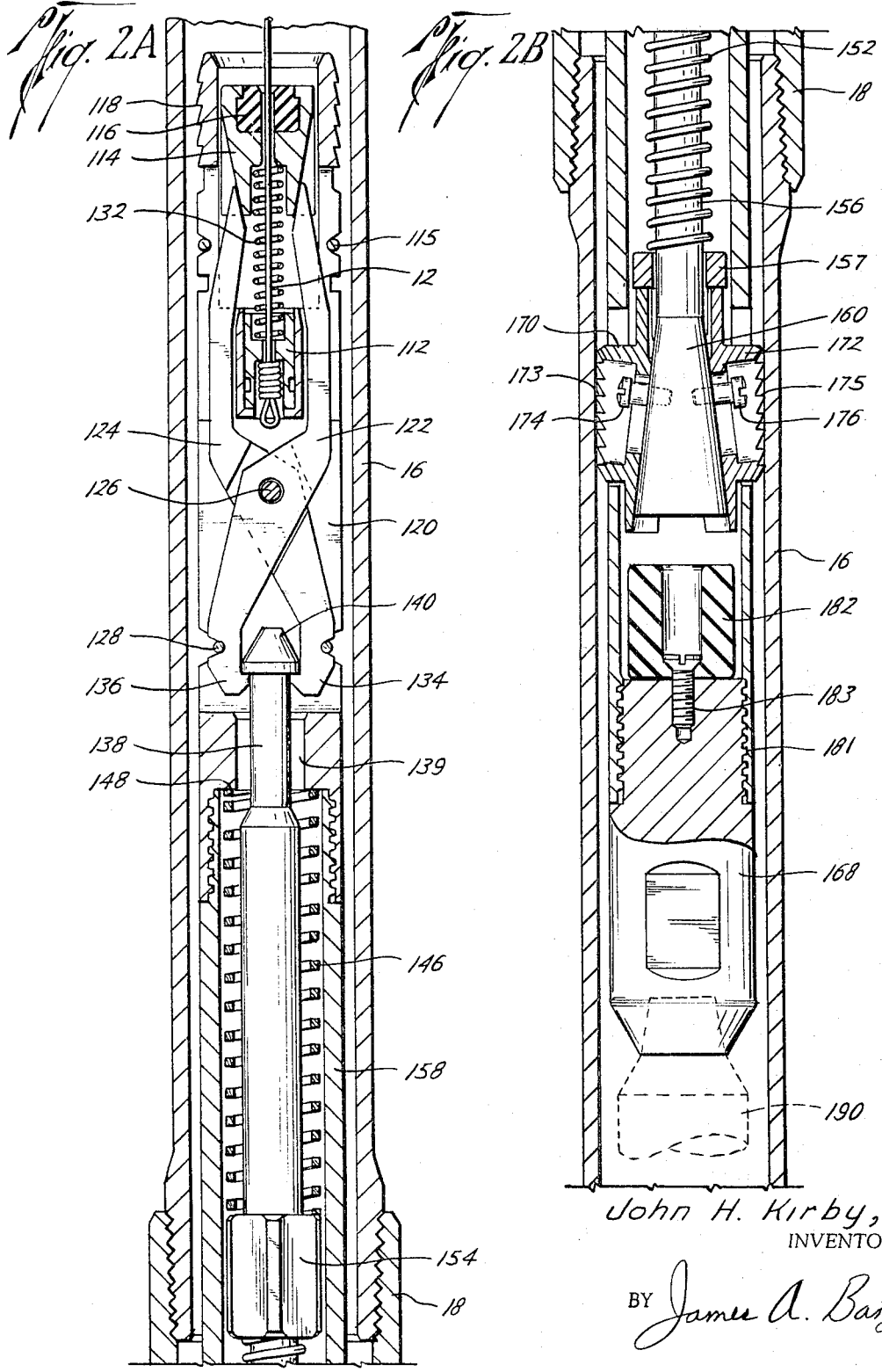

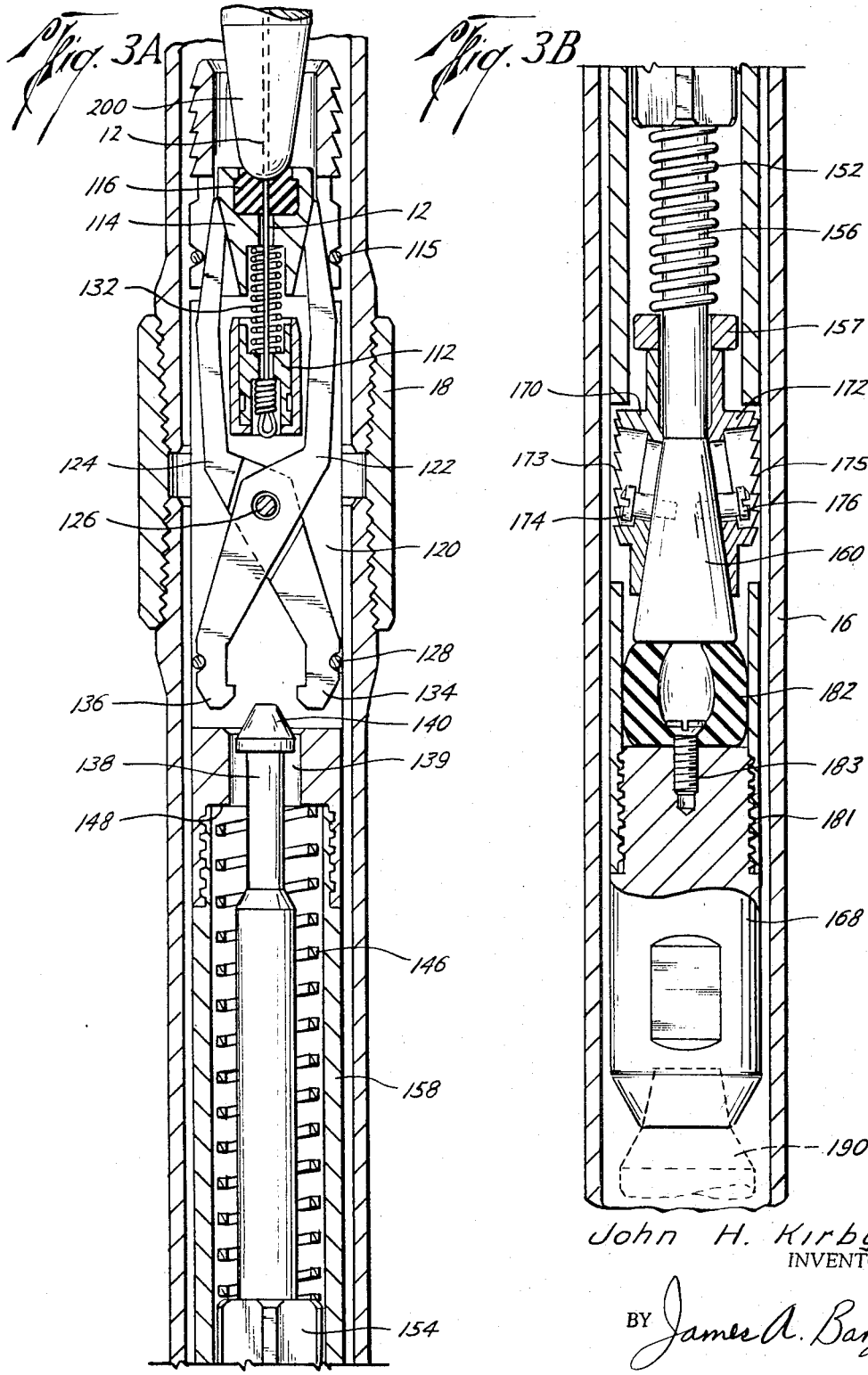

United States Patent Office 3,352,360
Patented Nov. 14, 1967

3,352,360
FREE POINT INDICATOR
John H. Kirby II, 7030 N. Stardust Circle, Rte. 6,
Box 644, Tucson, Ariz. 85702
Continuation of abandoned application Ser. No. 497,694,
Oct. 19, 1965, which is a continuation of abandoned
application Ser. No. 424,063, Jan. 7, 1965, which in turn
is a continuation of abandoned application Ser. No.
193,776, May 10, 1962. This application Dec. 5, 1966,
Ser. No. 599,320
3 Claims. (Cl. 166—55.1)

This invention pertains generally to well apparatus and particularly to apparatus used in finding the stuck-point of a tubular structure in a well bore and removing as much of such tubular structure as possible.

This application is a continuation of my copending application S.N. 497,694 filed Oct. 19, 1965, now abandoned, which copending application is a continuation of my prior application S.N. 424,063 filed Jan. 7, 1965, now abandoned, and which application in turn is a continuation of my prior application S.N. 193,776 filed May 10, 1962, now abandoned, and entitled, "Free Point Indicator."

Stuck-point or free-point indicators are known to the oil exploration and production industry and have been used extensively during drilling of wells and during workover operations. Such stuck-point or free-point indicators generally utilize various combinations of electrical circuits wherein capacitance, inductance, and reluctance or combinations thereof are used to determine the point at which a tubular member such as casing or tubing is lodged in a well bore. Some of the known stuck-point or free-point indicators have been partially satisfactory but most of the known stuck-point or free-point indicators can be utilized only with ferrous drill pipe or tubing. Also some of the known stuck-point or free-point apparatus do not provide means for severing the drill pipe or tubing immediately above the stuck-point to thereby free an optimum amount of the drill pipe or tubing.

Thus, it is an object of the present invention to provide an improved method for determining the stuck-point of tubular structures in a well bore.

Another object of the present invention is to provide apparatus which may be utilized in determining the stuck-point of a tubular member in a well bore regardless of the material composition of such tubular member.

Yet another object of the present invention is to provide improved means and methods for determining the stuck-point of a tubular structure in a well bore, such means and methods also providing severance of such tubular structure during the initial trip into the well bore.

A still further object of the present invention is to provide apparatus for determining the stuck-point or free-point of a tubular structure in a well bore, such apparatus being operable from either a wire line or a multiple conductor cable.

In the drawings, FIGURE 1 is a partial-sectional, elevational view of a well bore and apparatus wherein one embodiment of the invention is incorporated;

FIGURES 2A and 2B combined are a sectional, elevational view of one embodiment of apparatus wherein the invention is incorporated, such apparatus being in a locked position;

FIGURES 3A and 3B combined are a sectional, elevational view of the apparatus shown in FIGURES 2A and 2B such apparatus being in an unlocked position;

FIGURE 4 is a front elevational view of a slip segment of the apparatus of the present invention; and FIGURE 5 is a rear elevational view of the slip segment shown in FIGURE 4.

Briefly stated, the invention incorporates a system including well apparatus which is lowered on a flexible line inside a tubular member such as drill pipe or tubing. Such well apparatus is lowered to the approximate depth where the tubular member is stuck and then the well apparatus is pulled upwardly by the flexible line, thereby causing means of the well apparatus to engage the inside portion of the tubular member. Suitable registration means are coupled to the flexible line at the surface of the earth so that when the well apparatus is pulled upwardly by the flexible line, relative movement between the tubular member and the flexible line may be registered as the tubular member and the wire line are tensioned simultaneously from the surface of the earth. If the stuck point of the tubular member is deeper than the chosen testing point, the registration means will indicate that the tubular member is moving relative to the flexible line. The well apparatus then is lowered deeper into the well bore and the test is repeated at various depths until the registration means indicates that no relative movement is occurring between the tubular member and the flexible line. The registration means includes depth indicating means for indicating the depth at which the well apparatus is located and consequently the depth at which the test is being made. Subsequently, releasing means such as a go-devil releases the means of the well apparatus from engagement with the tubular member to allow removal of the well apparatus from the well bore. When the releasing means, engaging the tubular member, optional means such as an explosive charge couplable to the well apparatus may be detonated thereby severing the tubular member so that the upper, free portion may be removed from the well bore.

Referring now to the drawings in detail, FIGURE 1 is a partial-sectional, elevational view showing well apparatus 10 suspended on a flexible line 12 in a well bore 14 traversed by a tubular structure 16. Tubular structure 16 may be drill pipe or tubing compressed of a plurality of longitudinal sections coupled together by suitable means such as drill collars similar to drill collar 18.

The tubular structure 16 is coupled to a derrick 20 having a traveling block 22 to which is coupled elevator apparatus 24. Such elevator apparatus is well known in the art and includes elevator bails 26 and 28 coupled to spider 30. Spider 30 is coupled to tubular structure 16 which passes through rotary table 32. Adapted for positioning on the rotary table 32 is a structure 34 having sheaves 36, 38, and 40 coupled thereto for engaging flexible line 12. Flexible line 12 is coupled through registration means 42 to drum 60 on which the flexible line is wound. Drum 60 may be mounted on a vehicle trailer 62 having means 64 for rotating drum 60. In the described embodiment of the invention a wire line has been selected but any suitable flexible line, including conductor cable may be effectively utilized.

Registration means 42 may include means 44 for registering the pay out or amount of line which has been taken off of drum 60 thereby indicating the depth of well apparatus 10. Registration means 42 also includes suitable apparatus for registering changes in tension on the line 12. The change in tension on line 12 may be recorded on a suitable strain gage 46 which is coupled in a suitable manner to sheaves 48, 50, and 52. Although registration means 42 is shown disposed some distance away from the derrick, the location of the registration means is dictated primarily by choice of the operator thereof so long as the flexible line will record changes in tension thereon.

A feature of the present invention is that a single operator may be positioned near drum 60 on the trailer 62 and such operator may visually ascertain the amount of flexible line which has been taken off of drum 60 while also operating means 64 for applying tension to flexible line 12. When tension is applied to the line 12 by reversing the pay-out rotation of spool 60, the operator may visually determine from the registration means 42 whether or not a change in tension occurs on flexible line 12 as tension is applied to tubular structure 16 through elevator apparatus 24. Thus through the actuation of elevator apparatus 24 and the tension which is applied to flexible line 12, relative movement between the tubular member 16 and the flexible line 12 may be registered.

Well apparatus 10 is lowered through the tubular structure 16, with periodic tests being made as outlined above to determine relative movement between tubular structure 16 and flexible line 12. As long as the tested portion of tubular structure 16 is free, relative movement will occur and the consequent change in tension on flexible line 12 will be indicated on strain gage 46. At test points below or at the stuck pipe location, there will be no change in tension on flexible line 12 since the portion of the tubular structure 16 immediately above the well apparatus 10 will not stretch or move. In choosing test points while practicing the present invention, it is not necessary to utilize a collar locator as required in many of the prior art free-point indicators although a collar locator may be used as means for engaging the tubular structure 16. As will be explained subsequently, related means such as an explosive charge may be coupled to the lower portion of well apparatus 10. Well apparatus 10 is adapted for unrestricted downward movement in tubular structure 16 but upward movement of well apparatus 10 occurs only after a release mechanism in such well apparatus has been actuated. Well apparatus 10 will now be described in detail.

FIGURES 2A and 2B taken together are a sectional, elevational view of well apparatus 10 in locked position. Well apparatus 10 is similar in some respects to structure disclosed in my copending application entitled "Jet Pipe Cutter" Serial Number 117,540 filed June 16, 1961.

Well apparatus 10 comprises an upper section 120 to which middle section 158 is coupled. Lower section 168 is coupled to middle section 158.

Upper section 120 includes a shear plug 112 to which flexible line 12 is coupled. Disposed upwardly from shear plug 112 is a latch release plug 114 having a go-devil cushion 116 disposed therein. Intermediate the shear plug 112 and latch release plug 114 is release plug spring 132 which causes plug 114 to remain near the uppermost portion of upper section 120. Pivotally mounted on pin 126 are latch members 122 and 124 having fingers 132 and 136 which are normally in engagement with mandrel 138 having a head 140. An elastic ring 128 positioned on the outside of upper section 120 provides a holding force for retaining fingers 134 and 136 in engagement with head 140 while the release mechanism is locked. A similar elastic ring 115 acts as a retainer when the release mechanism is unlocked as will be explained subsequently. Fishing wickers 118 are provided on the upper portion of the well apparatus for fishing out of the well bore in a known manner when necessary.

Middle section 158 of well apparatus 10 may be substantially tubular in structure and disposed therein are means such as slips for engaging tubular structure 16 when the well apparatus is moved upwardly. Such means will be described in more detail subsequently.

Mandrel 138 is partially disposed in middle section 158. Aperture 139 allows the upper portion of mandrel 138 including head 140 to move downwardly when the well apparatus is being released into an unlocked condition. Mandrel 138 includes a shoulder section 154 and lower mandrel section 156. The lowermost portion of mandrel 138 is tapered thereby forming a tapered mandrel 160. Resilient means such as a spring 146 is positioned between shoulder 148 and shoulder section 154 of mandrel 138.

Resilient means such as a light spring 152 is disposed between shoulder section 154 and ring 157.

Means which may include slips 170 and 172 are disposed on the tapered mandrel 160 by suitable fastening means such as screws 174 and 176. Engaging means such as teeth 173 on slip 170 and teeth 175 on slip 172 are used for engaging tubular structure 16 when the wall apparatus 10 is "cocked" and pulled upwardly with the flexible line 12. Slips 170 and 172 may be changed quite easily to accommodate various diameters of tubular structures thereby alleviating the necessity of a large inventory of complete well apparatus 10. Only the slips of the well apparatus need to be replaced for different diameter tubing. Downward movement of the well apparatus 10 in tubular structure 16 is unrestrained as is apparent from the configuration of the teeth on slips 170 and 172. Although friction means have been described for engaging the wall of the tubular structure, means such as a collar locator might be used with only slight modification to the apparatus shown and described.

Lower section 168 of the well apparatus may be a bull plug threadly coupled by threads 181 to middle section 158. A pad 182 is positioned on the upper portion of lower section 168 with suitable means such as screw 183. In lieu of pad 182 and screw 183 other means 190 may be coupled to the lower portion of lower section 168 or substituted for lower section 168 completely. Means 190 may be detonating means, for example, for severing tubular structure 16 after the stuck-point of tubular structure 16 has been determined.

Referring again to FIGURE 1, in practicing the invention, structure 34 is positioned over the well bore as shown, with well apparatus in a cocked position as shown in FIGURES 2A and 2B, being coupled to flexible line 12. In locating the exact stuck point or points of tubular structure 16, the approximate stuck zone generally will be known. Means 44 is set so that as well apparatus 10 is lowered in the tubular structure 16, the depth of the well apparatus 10 will be shown on means 44. When the uppermost part of the stuck pipe zone has been reached by the well apparatus 10, the rotation of reel 60 is reversed so that predetermined tension of the order of 100 pounds is applied to flexible line 12 as the friction means engage the tubular structure 16. The registration on strain gage 46 is noted and then the string of pipe represented by tubular structure 16 is pulled upwardly. As long as the string of pipe above the well apparatus is free, there will be movement of the needle in strain gage 46 since the well apparatus 10 will be lifted somewhat as the entire upper part of the string of pipe is lifted and the tension on the flexible line is thereby decreased. The well apparatus 10 is gradually lowered deeper, the friction means allowing free downward movement but restraining upward movement of the well apparatus 10 when the same is in a cocked position. When no movement of the strain gage needle occurs the stuck pipe zone has been located.

The well apparatus 10 must be uncocked or released to allow removal thereof from the tubular structure 16 and suitable releasing means are utilized to cause the slips to move radially inwardly as shown in FIGURES 3A and 3B. Such releasing means may be electrical, pneumatic, hydraulic, or of any type designed to cause the friction means to be released.

The releasing means in the described embodiment of the invention is a go-devil 200 which is dripped along wire line 12 to engage latch release plug 114 at cushion 116. Latch release plug 114 moves downwardly thereby pivotally moving fingers 134 and 136 out of engagement with head 140 of mandrel 138. Spring 146 provides sudden downward movement of the mandrel 138 so that the tapered mandrel 160 is forced against pad 182. Such downward movement of mandrel 138 and tapered mandrel 160 causes radial inward movement of slips 170 and 172 thereby disengaging teeth 173 and 175 from the tubular member 16. Thus the well apparatus 10 may be moved upwardly and removed from the well bore. As explained previously, means 190 may be coupled to the lower portion of the well apparatus 10 for severing the tubular structure 16 so that the portion of the tubular structure 16 above the stuck zone can be removed in a known manner.

FIGURES 4 and 5 show detailed views of the slip 170. FIGURE 4 shows teeth 173 and aperture 192. Shoulder 194 is disposed against the lower portion of the head of screw 174 as may be seen in FIGURES 2B and 3B. Screws 174 and 176 and the apertures in the slips provide guides for the movement of the slips 170 and 172. As shown in the rear view of FIGURE 5 of the slip 170, tapered section 196 is adapted for engagement with tapered mandrel 160. Slotted section 198 of slip 170 is adapted for movement along lower mandrel section 156 as shown in FIGURES 2B and 3B. Although only two slips are shown in the described embodiment of the invention, it is to be appreciated that any number of slips having various configurations can be used in practicing the invention as long as such slips engage the tubular structure so that the flexible line 12 can be tensioned to allow proper functioning of registration means 42. As pointed out previously, slips may be used when friction means are utilized but use of a collar locator is not precluded.

Thus, the invention provides apparatus and methods for locating stuck points of tubular structures in a well bore and for severing such tubular structure without re-entering the well bore. Such apparatus and methods do not require locating collars or joints on the tubular structure when friction means are used and the present invention is not limited in operability to ferrous tubular structure as are many of the known stuck point indicators.

Although a preferred embodiment of the invention has been shown and described, it is to be understood that the invention is defined by the following claims. Although the claims may be presented in indented format to facilitate reading and understanding thereof, such format should not be construed as structurally or functionally limiting the claims.

I claim:
1. A device for determining the stuck point of a tubular structure disposed in a well bore and for severing the tubular structure, said device including in combination,
   a well apparatus coupled to a flexible line and having means for engaging said tubular structure, said well apparatus including explosive means, said well apparatus having a locked and unlocked condition,
   means coupled to the flexible line for providing upward and downward movement of said well apparatus in the tubular structure,
   registration means coupled to the flexible line for recording the tension on the flexible line and for recording the depth of said well apparatus in the well bore,
   lifting means coupled to the tubular structure for applying tension thereto, and
   means engageable with said well apparatus for changing said well apparatus from a locked condition to an unlocked condition and for detonating said explosive means whereby the tubular structure is severed.

2. The device defined by claim 1 wherein said well apparatus includes release means.

3. The device defined by claim 2 wherein said release means includes a mandrel member having a tapered portion.

References Cited

UNITED STATES PATENTS

| | | | |
|---|---|---|---|
| 2,358,466 | 9/1944 | Miller | 166—217 |
| 2,746,550 | 5/1956 | Mitchell | 166—4 |
| 2,918,125 | 12/1959 | Sweetman | 166—35 |

JAMES A. LEPPINK, *Primary Examiner.*